(12) United States Patent
Harke

(10) Patent No.: US 9,802,458 B2
(45) Date of Patent: Oct. 31, 2017

(54) MOTOR VEHICLE WITH A WATER BOX AND AN AIR CONDITIONER

(71) Applicant: WEIDMANN PLASTICS TECHNOLOGY AG, Rapperswil (CH)

(72) Inventor: Stefan Harke, Wollerau (CH)

(73) Assignee: WEIDPLAS GMBH, Kusnacht (CH)

(*) Notice: Subject to any disclaimer, the term of this patent is extended or adjusted under 35 U.S.C. 154(b) by 388 days.

(21) Appl. No.: 14/380,569

(22) PCT Filed: Feb. 21, 2013

(86) PCT No.: PCT/EP2013/053412
§ 371 (c)(1),
(2) Date: Aug. 22, 2014

(87) PCT Pub. No.: WO2013/124337
PCT Pub. Date: Aug. 29, 2013

(65) Prior Publication Data
US 2015/0013372 A1   Jan. 15, 2015

(30) Foreign Application Priority Data
Feb. 23, 2012  (EP) .................................... 12156661

(51) Int. Cl.
*F25D 21/14* (2006.01)
*B60H 1/00* (2006.01)
(Continued)

(52) U.S. Cl.
CPC .......... *B60H 1/00021* (2013.01); *B60H 1/28* (2013.01); *B60H 1/3202* (2013.01); *B60H 1/3233* (2013.01); *F25D 21/14* (2013.01)

(58) Field of Classification Search
CPC .. B60H 1/3202; B60H 1/323; B60H 1/00007; B60H 1/00021; F25D 21/14; F24F 3/147
See application file for complete search history.

(56) References Cited

U.S. PATENT DOCUMENTS 2,277,552 A * 3/1942 Kneedler ........... B60H 1/00021
126/113
3,735,604 A * 5/1973 Astl .......................... F28D 5/00
62/316
(Continued)

FOREIGN PATENT DOCUMENTS

DE          94 05 933 U1     6/1994
DE          199 32 691 A1    1/2001
(Continued)

OTHER PUBLICATIONS

International Search Report for PCT/EP2013/053412 dated May 22, 2013 [PCT/ISA/210].
(Continued)

*Primary Examiner* — Elizabeth Martin
(74) *Attorney, Agent, or Firm* — Sughrue Mion, PLLC

(57) ABSTRACT

A car having a water box comprising an outer face, an inner face, an air inlet opening, an air outlet opening and a water outlet opening. The inner face forms a water separating space that is connected to the air inlet and outlet openings and the water outlet opening. The water outlet opening discharges water out of the separating space. An air conditioner is connected to the air outlet opening to feed air from the water box into the air conditioner. An air feeding unit sucks the air into the air conditioner via the air inlet opening. The air feeding unit is designed as a suction fan. The water box comprises a wall that comprises fibers forming a non-woven fabric i.e. felt.

15 Claims, 4 Drawing Sheets

Figure 1:
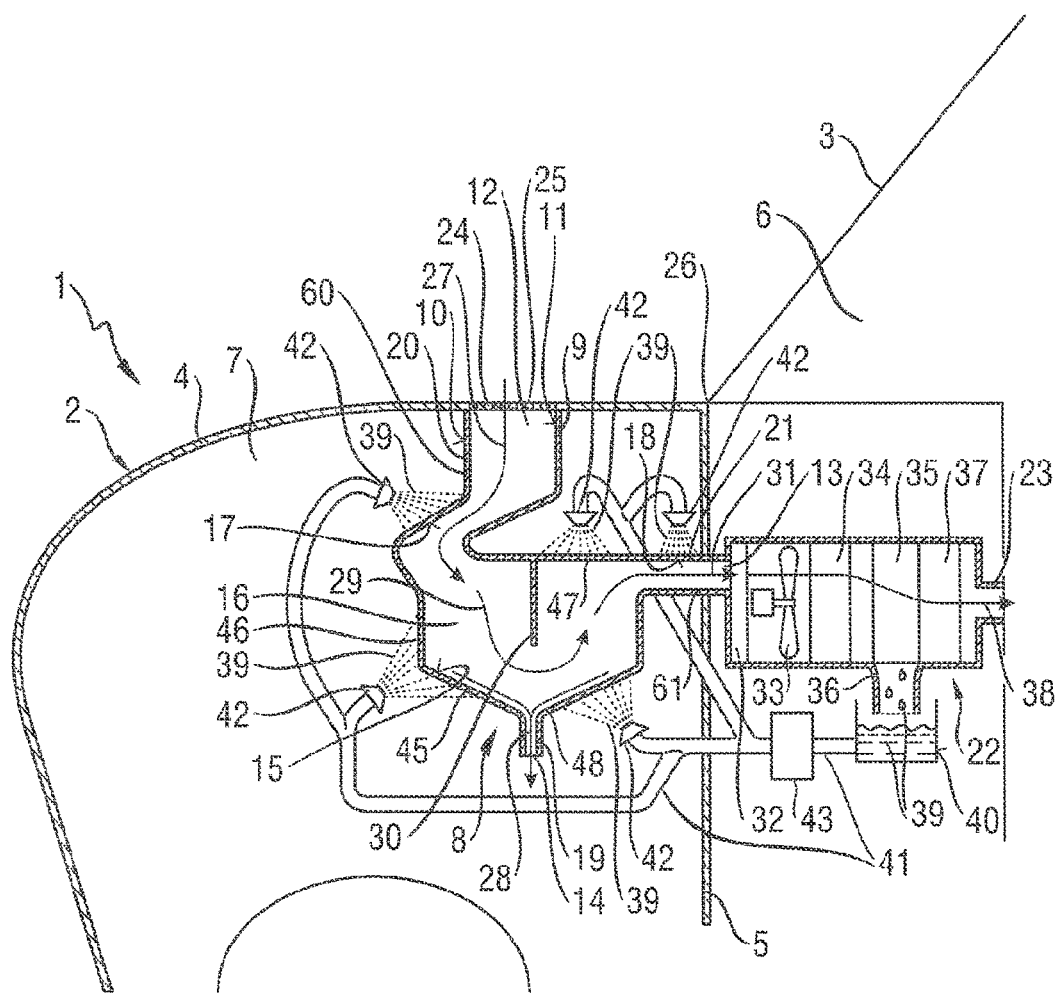

(51) Int. Cl.
*B60H 1/28* (2006.01)
*B60H 1/32* (2006.01)

(56) References Cited

U.S. PATENT DOCUMENTS

| | | | | |
|---|---|---|---|---|
| 4,323,191 A | * | 4/1982 | Chiyoda | B60H 3/022 236/44 A |
| 5,335,719 A | * | 8/1994 | Khelifa | B60H 1/00007 165/42 |
| 2007/0234566 A1 | * | 10/2007 | Hsu | F28D 15/046 29/890.03 |

FOREIGN PATENT DOCUMENTS

| | | |
|---|---|---|
| DE | 102 21 191 A1 | 8/2003 |
| JP | 4-159125 A | 6/1992 |

OTHER PUBLICATIONS

Written Opinion for PCT/EP2013/053412 dated Feb. 23, 2012 [PCT/ISA/237].

* cited by examiner

MOTOR VEHICLE WITH A WATER BOX AND AN AIR CONDITIONER

CROSS REFERENCE TO RELATED APPLICATIONS

This application is a National Stage of International Application No. PCT/EP2013/053412, filed on Feb. 21, 2013, which claims priority from European Patent Application No. 12 156 661.6, filed on Feb. 23, 2012, the contents of all of which are incorporated herein by reference in their entirety.

The invention relates to a motor vehicle.

DE19932691A1 discloses a vehicle having an interior compartment and a conventional air conditioner. The air conditioner can collect condensed water arising during driving. Before inlet air enters the passenger compartment of the vehicle, the inlet air is humidified with the condensed water by means of a humidifying unit. The humidifying unit is a humidifying turbine, for example. In this case, the condensed water is sprayed onto a rapidly rotating rotor of the turbine. In this process, the condensed water is flung centrifugally outward and is atomized and vaporized in the inlet air to form fine aerosols, thereby reducing the temperature of the inlet air before it enters the passenger compartment. The disadvantage here is that the air humidity of the inlet air which is fed to the passenger compartment rises. As an alternative, it is also possible according to DE19932691A1 for the outlet air from the passenger compartment to be cooled by spraying the condensed water onto a rapidly rotating rotor of the turbine, wherein the outlet air is used to cool the inlet air fed to the passenger compartment by means of the heat exchanger. The disadvantage here is that the construction described is complex.

It is thus the underlying object of the invention to reduce energy consumption in a motor vehicle.

In the motor vehicle according to the invention, the air that can be fed to the air conditioner should be precooled in such a way that, on the one hand, there is no increase in air humidity and, on the other hand, that a simpler construction is ensured.

The motor vehicle according to the invention comprises a passenger compartment, a water box, which has a wall, wherein the wall forms an outer side and an inner side of the water box, an air conditioner having an evaporator for separating water from the air fed to the air conditioner, a device for collecting and applying the water separated out at the evaporator to at least one partial area of the water-box outer side formed by the wall of the water box, and further comprising an air feeding device for drawing air into the air conditioner. The water box has at least one air inlet opening, at least one air outlet opening and at least one water outlet opening. The water-box inner side formed by the wall of the water box forms a water separating space, wherein the water outlet opening is suitable for discharging water from the water separating space. The water separating space is connected to the air inlet opening, the air outlet opening and the water outlet opening. Via the air inlet opening, splashing water, e.g. rainwater or water from a carwash, can enter the water box and can leave the water box again via the water separating space and the water outlet opening. Via the air inlet opening, air, e.g. ambient air, can furthermore enter the water box and said air leaves the water box again at least in part, preferably completely, via the water separating space and the air outlet opening. The air outlet opening is connected to the air conditioner, thus allowing the air leaving the water box via the air outlet opening to flow at least in part, preferably completely, into the air conditioner. The air conditioner has said evaporator, which can cool the air fed to the air conditioner, thereby allowing water present in the air to be at least partially separated from the air. In addition to the evaporator, the air conditioner can also have a heater and an air filter, for example, in a manner known per se, although this is not essential. In addition, the air feeding device, e.g. a suction blower, can be integrated into the air conditioner. The air feeding device is suitable for drawing air into the air conditioner via the air inlet opening, the water separating space and the air outlet opening. The air conditioner is connected to the passenger compartment, thus ensuring that the air flowing through the air conditioner enters the passenger compartment at least in part, preferably completely, or that air-conditioned air enters the passenger compartment. The motor vehicle according to the invention has a device for collecting and applying the water separated out at the evaporator, or condensed water, in order to apply said water to at least one partial area of the outer side, preferably to the entire outer side, of the water box. The temperature of the water separated out at the evaporator, and thus also the temperature of the water applied to the outer side of the water box, is normally in a range of from about 2° C. to about 30° C. The water applied to the water-box outer side formed by the wall can volatilize again through evaporation or vaporization since, during the operation of the motor vehicle, the temperature of the outer side of the water box is correspondingly high. During the operation of the motor vehicle, the temperature of the outer side of the water box corresponds approximately to the mean engine compartment temperature. The temperature of the outer side of the water box and thus approximately also the temperature of the wall forming the outer side of the water box is normally in a range of from about 40° C. to about 120° C. Since heat from the wall of the water box can cross over to the water applied to the outer side of the water box, the water can volatilize and the temperature of the wall of the water box can thereby be lowered. Owing to the lowered temperature of the wall of the water box, heat can cross over from the air flowing through the water box to the wall of the water box, thereby enabling the temperature of the air flowing through the water box to be lowered. In general terms, cooling of the air flowing through the water box occurs if the temperature of the air flowing through is higher than the temperature of the inner side of the water box. The cooling of the air flowing through the water box takes place especially if the temperature of the air flowing through it is above about 20° C. Fundamentally, the situation is as follows: the higher the temperature of the air flowing through the water box relative to the temperature of the inner side of the water box, the greater is the cooling of the air flowing through. The motor vehicle according to the invention thus has the advantage that the air entering the air conditioner is already precooled. It is thus possible to reduce the cooling capacity of the air conditioner or the energy for operating the air conditioner. Reducing the energy consumption of the air conditioner is desired, particularly in the case of electric vehicles, since the range of the electric vehicle can thereby be increased. Temperature-insulating material is arranged on the outer side of each of the prior-art water boxes, especially in the case of water boxes which are arranged in the engine compartment, in order to minimize the temperature stress on the wall forming the outer side of the water box. Applying the temperature-insulating material to the wall forming the outer side of the water box is complex. The motor vehicle according to the invention thus has the advantage that it is possible to dispense with the arrangement of temperature-insulating material on the outer side of the water box. Another advantage of the motor vehicle according to the invention is that the air humidity of the air fed to the air conditioner is not increased. Moreover, the motor vehicle according to the invention has a simpler construction.

According to a development of the invention, the device for collecting and applying the water comprises at least one feed line. The feed line carries the water separated out at the evaporator toward the outer side of the water box. The feed line can furthermore have the function of collecting the water separated out at the evaporator and/or of applying the water separated out at the evaporator to the outer side of the water box.

According to a development of the invention, the feed line has at least one inlet opening and at least one outlet opening, wherein the inlet opening and the outlet opening are connected to one another by a cavity, wherein fibers suitable, by means of the capillary effect, for transporting the water separated out at the evaporator at least from the inlet opening to the outlet opening and for releasing said water again are arranged at least in the cavity. The fibers are preferably in the form of a nonwoven. The fibers can project from the inlet opening and/or outlet opening. The fibers projecting out of the outlet opening are preferably present on at least one partial area of the outer side of the water box. The fibers projecting out of the inlet opening preferably project into a reservoir for collecting the water separated out at the evaporator. A person skilled in the art will be familiar with fibers having the properties required in this section.

According to a development of the invention, the device for collecting and applying the water comprises at least one spray nozzle. The function of the spray nozzle is to apply the water separated out at the evaporator to at least one partial area of the outer side of the water box, e.g. in droplet form.

According to a development of the invention, the device for collecting and applying the water comprises at least one fluid pump. The function of the fluid pump is to transfer the water separated out at the evaporator to the outer side of the water box, preferably via the feed line.

According to a development of the invention, the device for collecting and applying the water comprises at least one reservoir for collecting the water separated out at the evaporator.

According to a development of the invention, the air feeding device comprises at least one suction blower. The air feeding device has the effect that air can be drawn into the air conditioner via the air inlet opening.

According to a development of the invention, the air conditioner has the air feeding device.

According to a development of the invention, the wall which forms the outer side of the water box has fibers, such that at least one partial area of the outer side of the water box is formed by fibers, which are suitable, in accordance with the capillary effect, for absorbing the water separated out at the evaporator, for storing the absorbed water and for releasing the stored water again. In this water box, the fibers are thus part of the wall. The wall of the water box thus has an outer wall part containing the fibers, wherein the fibers form at least a partial area of the outer side of the water box, and an inner wall part. The inner wall part forms the inner side of the water box and is secured detachably and/or nondetachably on an inner surface of the outer wall part by way of an outer surface. A person skilled in the art will know a large number of methods of producing a water box of this kind. For example, a water box of this kind can be produced by inserting the fibers, preferably in the form of a nonwoven, into an injection mold and, after the insertion of the nonwoven, injecting plastic behind them, for example. Another possibility of producing a water box of this kind is to produce the inner wall part of the water box in a first step, e.g. by means of injection molding, from plastic for example. In a second step, the outer wall part containing fibers, preferably in the form of a nonwoven produced from the fibers, is adhesively bonded to said outer surface of the inner wall part, for example. The fibers preferably have temperature-insulating properties. The fibers preferably form a nonwoven, preferably a felt. The water applied to the at least one partial area, formed by the fibers, of the outer side of the water box is absorbed by the fibers, wherein the water thereby reaches the outer surface of the inner wall part. The water is furthermore stored by the fibers in the outer wall part. The water on the outer surface of the inner wall part can volatilize again through evaporation or vaporization. The volatilization of the stored water lowers the temperature of the inner wall part. The inner wall part at a lower temperature then has the effect of lowering the temperature of the air flowing through the water box. The storage function of the fibers makes possible continuous cooling of the inner wall part of the water box without the need to apply the water separated out at the evaporator continuously to the outer side of the water box. It is also conceivable for the wall forming the outer side of the water box to consist substantially or completely of the fibers. Fibers which have the properties stated in this paragraph are known to a person skilled in the art. The decisive factor for the fibers is that they should have good absorption capacity for water.

According to a development of the invention, at least one device for separating water from the air flowing through the water box is arranged in the water separating space. The device is preferably connected to the wall which forms the outer side of the water box. For example, the device comprises at least one baffle element projecting into the water separating space for deflecting the air flowing through the water box. The device is preferably designed in such a way that the air flowing through the water box can release heat to the device, wherein the device can release this heat to the wall forming the outer side of the water box. This heat is dissipated, in turn, by volatilization of the water on the outer side of the water box.

According to a development of the invention, the water separating space is connected directly to the air inlet opening, the air outlet opening and the water outlet opening. In a water box of this kind, the water separating space is formed exclusively by the inner side of the wall, which forms the outer side of the water box. The wall of a water box of this kind preferably has a bottom wall and a side wall. More preferably, the wall has a top wall in addition to the bottom wall and to the side wall. The bottom wall preferably has a water outlet opening.

According to a development of the invention, the wall forms at least one air outlet line, which connects the air outlet opening to the water separating space.

According to development of the invention, the wall forms at least one air feed line, which connects the air inlet opening to the water separating space.

According to a development of the invention, the wall has a first wall section and a second wall section and/or a third wall section, wherein the first wall section forms a partial area of the inner side of the water box, wherein the first partial area forms the water separating space, wherein the second wall section forms at least one air feed line, which connects the air inlet opening to the water separating space, and wherein the third wall section forms at least one air outlet line, which connects the air outlet opening to the water separating space. The first wall section preferably has the water outlet opening. The second wall section and/or third wall section is connected detachably or nondetachably to the first wall section. The first wall section preferably has a bottom wall and a side wall. More preferably, the first wall section has a top wall in addition to the bottom wall and to the side wall. The bottom wall preferably has the water outlet opening.

According to a development of the invention, the water separating space has a first zone and a second zone, which are connected to one another, wherein the first zone and the second zone are each connected to the at least one water outlet opening and wherein at least one device for separating water from the air flowing through the water box is arranged in the second zone. The second zone is preferably connected to the air outlet opening. The first zone is preferably connected to the air inlet opening.

According to a development of the invention, the motor vehicle has a windshield having a bottom edge and has an engine hood, wherein the bottom edge and the engine hood form a gap and wherein the air inlet opening is arranged in the gap or under the gap.

According to a development of the invention, the motor vehicle has an engine hood having at least one opening, wherein the air inlet opening is arranged in the opening or under the opening.

According to a development of the invention, the air outlet opening is connected to the air conditioner by at least one air feed line.

According to a development of the invention, the air inlet opening and/or the air outlet opening is/are arranged above the water outlet opening.

According to a development of the invention, the motor vehicle has an engine compartment, wherein the water box is arranged in the engine compartment.

According to a development of the invention, the air conditioner is arranged in the passenger compartment.

According to a development of the invention, the motor vehicle has a bulkhead, which divides the motor vehicle into an engine compartment and the passenger compartment.

According to a development of the invention, the wall which forms the outer side and the inner side of the water box is produced from plastic. The plastic preferably comprises polypropylene and/or polyamide.

Preferably, the evaporator is arranged in the passenger compartment and the water box in the engine compartment. In this case, the water used to cool the water box passes from the passenger compartment into the engine compartment, and the fresh air drawn in and cooled in the water box passes from the water box into the passenger compartment or into the air conditioner arranged in the latter.

To cool the water box, it is possible according to a development of the invention to use water which arises in the interior of the water box as splashing water or condensed water. This water can be transferred to the outer side of the water box through relatively small openings or pores in a wall of the water box and can volatilize there and correspondingly lower the temperature of said wall. To cool the wall, it is also possible to use water which is discharged through the water outlet opening.

Figure 2:
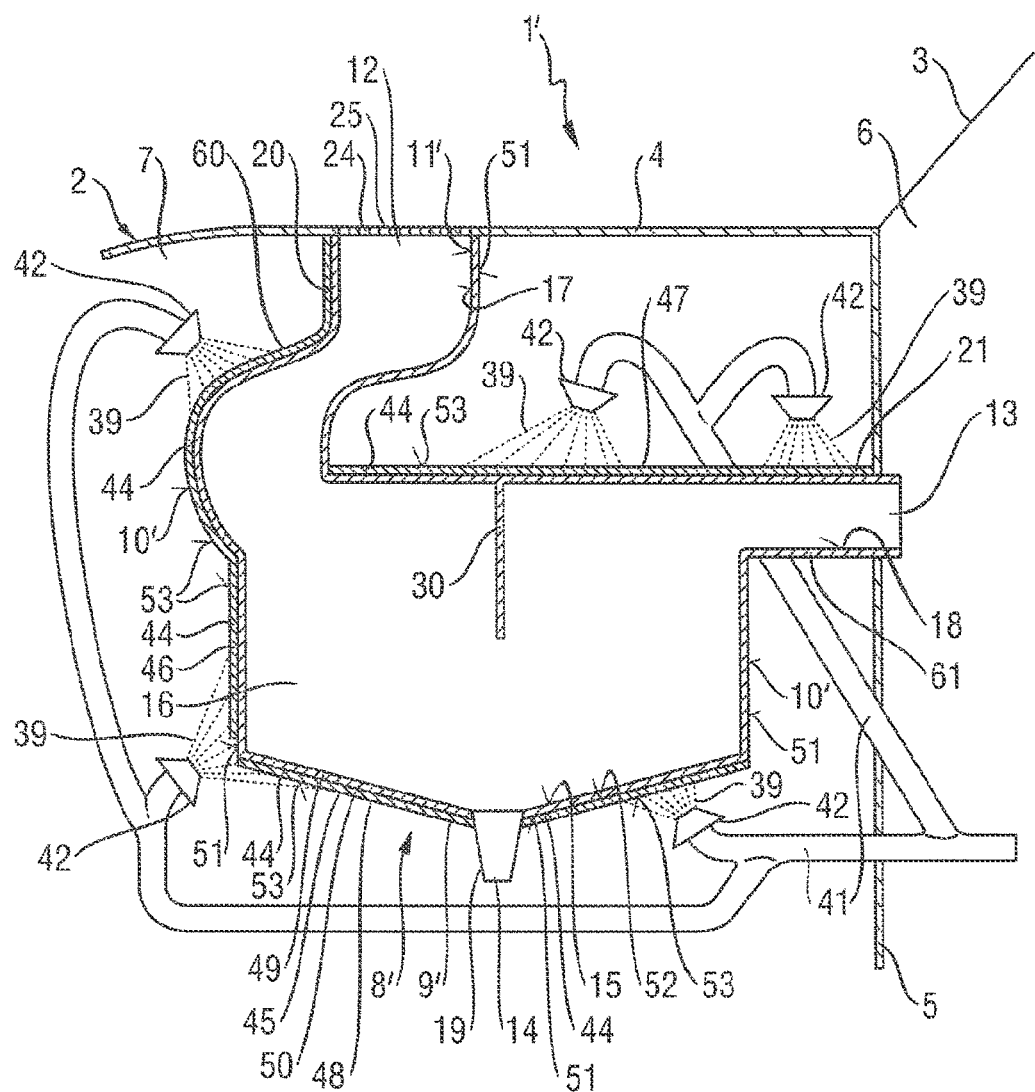
Figure 3:
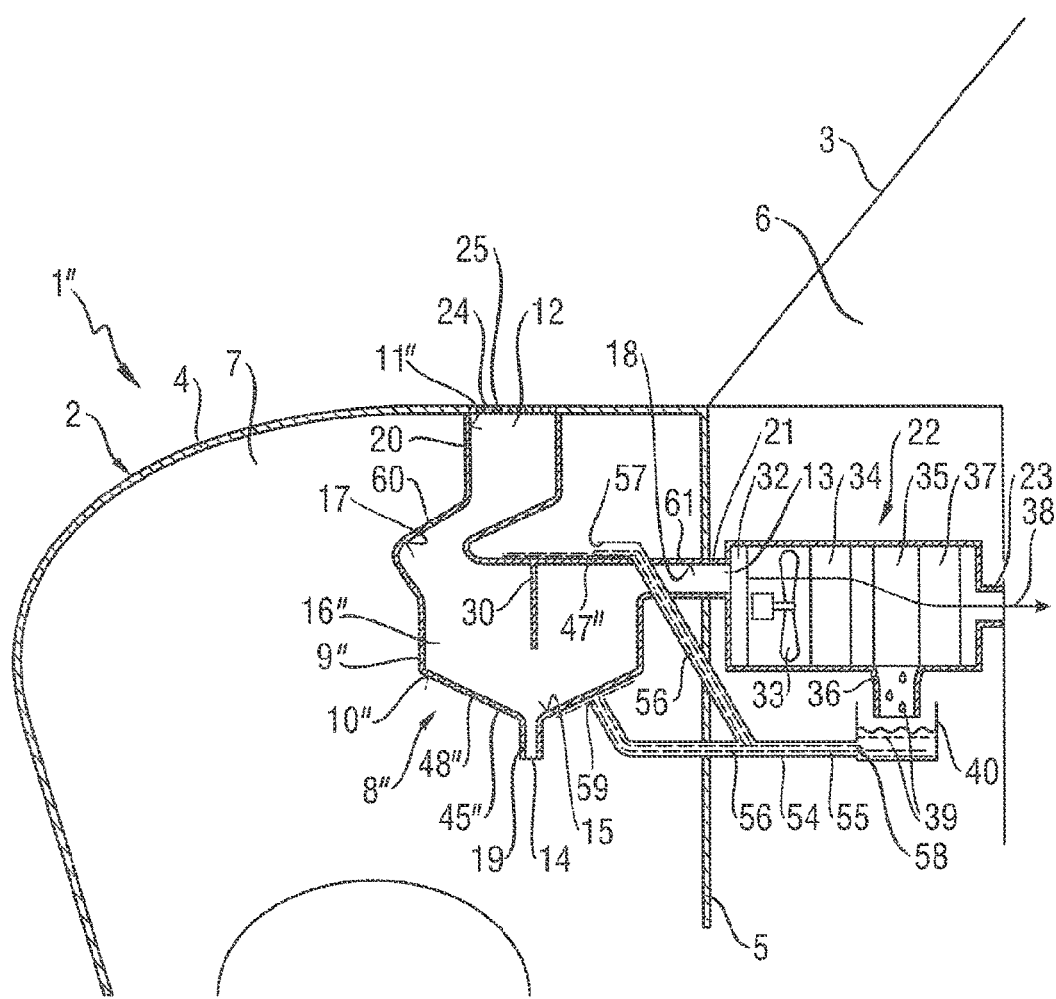
Figure 4:
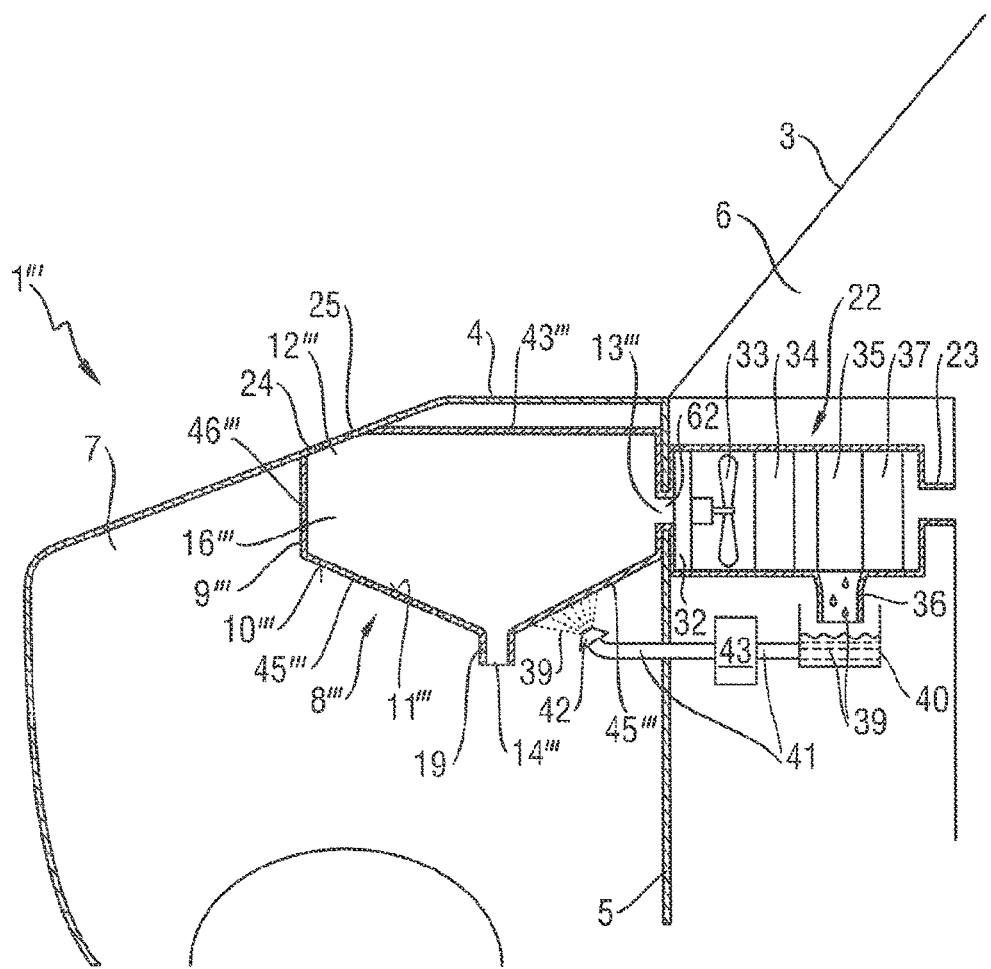

Further advantageous features of the invention will become apparent from the following description and from the drawings. Illustrative embodiments of the invention are explained below by means of drawings, in which:

FIG. 1 shows a section through a front part of a motor vehicle according to the invention in schematic form, FIG. 2 shows the enlarged illustration of a partial area of a first variant of the section in FIG. 1 in schematic form, FIG. 3 shows a second variant of the section through the front part of the motor vehicle according to the invention in accordance with FIG. 1 in schematic form, and FIG. 4 shows a third variant of the section through the front part of the motor vehicle according to the invention in accordance with FIG. 1 in schematic form.

As is usual, the motor vehicle 1 shown in FIG. 1 has a body 2, a windshield 3 and an engine hood 4. A bulkhead 5 divides the interior compartment of the motor vehicle 1 into a passenger compartment 6 and an engine compartment 7. A water box 8, which is produced from plastic for example, is arranged under the engine hood 4 in the engine compartment 7. The plastic comprises talc-filled polypropylene and/or polyamide, for example. However, the water box 8 can also be part of the body 2 and can be produced from metal, for example. The water box 8 has a wall 9, which forms an outer side 10 and an inner side 11 of the water box 8. Moreover, the water box 8 has an air inlet opening 12, an air outlet opening 13 and a water outlet opening 14, wherein the water outlet opening 14 is arranged at the lowest point of the water box 8. The water box 8 can also have a plurality of air inlet openings, a plurality of air outlet openings or a plurality of water outlet openings. The inner side 11 has a partial area 15 which forms a water separating space 16, which is connected to the air inlet opening 12, the air outlet opening 13 and the water outlet opening 14. The air inlet opening 12 is connected to the water separating space 16 by a tubular air feed line 20 formed by the wall 9. The wall 9 furthermore forms a tubular air outlet line 21, which connects the air outlet opening 13 to the water separating space 16. Of course, the water box 8 can also have a plurality of air feed lines and/or a plurality of air outlet lines. The water outlet opening 14 is connected directly to the water separating space 16. The wall 9 of the water box 8 thus has a first wall section 48, a second wall section 60 and a third wall section 61. The first wall section 48 forms the partial area 15 of the inner side 11 of the water box 8 which, in turn, forms the water separating space 16. The air feed line 20 is formed by the second wall section 60, wherein the second wall section 60 forms a partial area 17 of the inner side 11 of the water box 8. The air outlet line 21 is formed by the third wall section 61, wherein the third wall section 61 forms a partial area 18 of the inner side 11 of the water box 8. The partial areas 15, 17 and 18 thus jointly form the inner side 11 of the water box 8. The first wall section 48 in turn has a bottom wall 45, a side wall 46 and a top wall 47, as can be seen in FIG. 1. The second wall section 60 and the third wall section 61 are connected nondetachably to the first wall section 48. A nondetachable connection is provided, for example, if the third wall section 61 forming the air outlet line 21 and the second wall section 60 forming the air feed line 20 are connected integrally to wall section 48, as illustrated in FIG. 1. However, it is also conceivable that the second wall section 60 and/or the third wall section 61 will be connected detachably to the first wall section 48. A detachable connection is a plug-type connection, a bayonet connection or some other suitable connection, for example. The air outlet opening 13 opens into an air conditioner 22, which is connected to the passenger compartment 6 by an air feed line 23. As illustrated in FIG. 1, the air conditioner 22 is preferably arranged in the passenger compartment 6 but can also be located in the engine compartment 7. As can be seen in FIG. 1, the air inlet opening 12 formed by the air feed line 20 is arranged under an opening 24 in the engine hood 4, said opening being covered by a grille 25. The grille 25 prevents the entry of foliage or other larger-area contaminants into the water box 8, for example. According to another variant, the air feed line 20 projects into the opening 24 in the engine hood 4, with the result that the air inlet opening 12 is arranged in the opening 24. In this case, the air inlet opening 12 is covered with a grille (not shown). In another embodiment, a bottom edge 26 of the windshield 3 and the engine hood 4 form a gap, wherein the air inlet opening 12 is arranged in the gap or above the gap (not shown). Further variants are, of course, conceivable.

As can be seen in FIG. 1, the water outlet opening 14 is connected directly to the water separating space 16. It is also possible for there to be a plurality of water cutlet openings connected to the water separating space 16, e.g. a standby water outlet opening (not shown), for example. The function of this standby water outlet opening is to carry additional water out of the water box 8 if the water outlet opening 14 is overloaded. For example, the water outlet opening 14 can be an opening formed through the bottom wall 45 (not shown). As illustrated in FIG. 1, the water outlet opening 14 is preferably formed by a valve 19 that can be opened and closed again in order to prevent the inflow of unwanted extraneous air into the water box 8. The valve 19 can be a controlled valve.

Via the opening 24 in the engine hood 4, said opening being covered by the grille 25, and the air inlet opening 12 in the water box 8, ambient air or fresh air, which may be laden with water, can then enter the water box 8 in accordance with arrow 27. The air flow in accordance with arrow 27 occurs primarily if the air feeding device 33 of the air conditioner 22 is in operation and thus producing a vacuum in the water box 8 and hence is drawing air into the air conditioner 22 via the opening 24, the air inlet opening 12, the air feed line 20, the water separating space 16 and the air outlet line 21. The air feeding device 33 is designed as a suction blower, for example, as illustrated in FIG. 1. A very wide variety of air feeding devices is known to a person skilled in the art. The air feeding device 33 does not necessarily have to be part of the air conditioner 22, as illustrated in FIG. 1, and can also be arranged outside the air conditioner 22. It is likewise possible, in accordance with arrow 27, for splashing water, e.g. rainwater or water from a carwash, flowing off the engine hood 4 or off the windshield 3 via the engine hood 4, for example, to enter the water box 8. The splashing water entering the water box 8 in accordance with arrow 27 passes into the water separating space 16 and can be discharged again from the water box 8 via the valve 19 in accordance with arrow 28. The air entering the water separating space 16 in accordance with arrow 27 is deflected in accordance with arrow 29 by means of a device 30 arranged in the water separating space 16, said device being designed as a baffle element projecting into the water separating space 16, for example, as illustrated in FIG. 1. By virtue of this deflection of the air, it is possible, if the air is laden with water, for water to be separated out from the air at the baffle element, e.g. in the form of droplets, it then being possible, in turn, for said water to be discharged from the water box 8 via the valve 19 in accordance with arrow 28. The device 30 can also be designed in such a way that the air flows around it horizontally. A very wide variety of devices in a water box for separating water from the air flowing through the water box is known to a person skilled in the art. The deflected air leaves the water separating space 16 in accordance with arrow 31 and flows via the air outlet line 21 and the air outlet opening 13 into the air conditioner 22.

The air conditioner 22 illustrated in FIG. 1 has a prefilter 32, the air feeding device 33, an air filter 34, an evaporator 35, a water separator 36 and a heating device 37. The heating device 37 of the air conditioner 22 is used to increase the temperature of the air coming from the evaporator 35, if necessary. In accordance with arrow 38, the air entering the air conditioner 22 flows through the air conditioner 22 and leaves the air conditioner 22 via the air feed line 23 and enters the passenger compartment 6 as air conditioned air. The air that has entered the air conditioner 22 initially flows through the prefilter 32 and past the air feeding device 33 and then passes through the air filter 34. The air can then be cooled at the evaporator 35, and water 39 can thereby be separated from the air or condensed water can be generated. The air conditioner 22 illustrated in FIG. 1 is merely illustrative. Various air conditioners for motor vehicles which have an evaporator are known to a person skilled in the art. The decisive factor for the air conditioner of the motor vehicle according to the invention is that the air conditioner should be suitable for cooling the air flowing through the air conditioner and thereby separating water from the air or generating condensed water. The air conditioner can be designed as an air conditioning module, but this is not essential. By way of example, the water 39 separated from the air is discharged from the air conditioner 22 via the water separator 36 and applied to the outer side 10 of the water box 8 by means for collection and application, as illustrated in FIG. 1. According to FIG. 1, said device comprises a reservoir 40, a feed line 41, a plurality of spray nozzles 42 and a fluid pump 43. The water 39 discharged from the air conditioner 22 via the water separator 36 is collected in the reservoir 40 and is transferred to the outer side 10 of the water box via the feed line 41 by means of the fluid pump 43 and applied to partial areas of the outer side 10 of the water box 8 by means of the spray nozzles 42, as illustrated in FIG. 1. The water 39 is preferably applied to the entire outer side 10 of the water box 8. The water 39 applied to the outer side 10 volatilizes again through evaporation or vaporization since, during the operation of the motor vehicle 1, the temperature of the outer side 10 of the water box 8 is correspondingly high. The temperature of the outer side 10 of the water box 8 and hence approximately also the temperature of the wall 9 which forms the outer side 10 of the water box 8 is normally in a range of from about 40° C. to about 120° C. Since heat can cross over from the wall 9 of the water box 8 to the water 39 applied to the outer side 10 of the water box 8, the water 39 can volatilize, and the temperature of the wall 9 of the water box 8 can thereby be lowered. By virtue of the lowered temperature of the wall 9, heat can cross over from the air flowing through the water box 8 to the wall 9, thereby making it possible to lower the temperature of the air flowing through the water box 8. The motor vehicle 1 according to the Invention thus has the advantage that the air entering the air conditioner 22 is already precooled. The cooling capacity of the air conditioner 22 or the energy for the operation of the air conditioner 22 can thus be reduced. The device for collecting and applying the water separated out at the evaporator is described purely by way of example with reference to FIG. 1.

FIG. 2 shows the enlarged illustration of a partial area of a second variant of the section shown in FIG. 1 in schematic form. The construction and operation of the motor vehicle 1', which is illustrated only partially in FIG. 2, corresponds substantially to the construction and operation of the motor vehicle 1 described with reference to FIG. 1. FIG. 2 shows the essential difference between motor vehicle 1' and the motor vehicle 1 shown in FIG. 1. FIG. 2 shows a water box 8', the wall 9' of which, which forms the outer side 10' of the water box 8', is in two parts in contrast to the water box 8 according to FIG. 1 and has an inner wall part 49 and an outer wall part 50. The inner wall part 49 forms the inner side 11' of the water box 8' and has an outer surface 51. The outer wall part 50 has an inner surface 52 and an outer surface 53. The inner wall part 49 and the outer wall part 50 are connected to one another by the outer surface 51 and the inner surface 52. As can be seen in FIG. 2, the outer wall part 50 is arranged on partial areas of the outer surface 51 of the inner wall part 49, and therefore the outer surface 51 and the outer surface 53 form the outer side 10' of the water box 8'. The outer wall part 50 is preferably arranged over the entire outer surface 51 of the inner wall part 49. The outer wall part 50 is secured detachably or nondetachably on the inner wall part 49. The outer wall part 50 contains fibers 44 and the inner wall part 49 is produced from plastic, for example. As already described in connection with FIG. 1, the water 39 is transferred to the outer side 10' of the water box 8' via the feed line 41 and is applied substantially to the outer surface 53 of the outer wall part 50 by means of the spray nozzles 42, as indicated by dashed lines. Of course, the water 39 can also additionally be applied to the outer surface 51 of the inner wall part 49. The fibers 44 are suitable, on the one hand, for absorbing the water 39 (indicated by dashed lines) in accordance with the capillary effect, with the result that this water 39 reaches the outer surface 51 of the inner wall part 49, and, on the other hand, for storing the water 39 absorbed. The temperature of the outer surface 51 of the inner wall part 49 of the water box 8' and thus approximately also the temperature of the wall part 49 is normally in a range of about 40° C. to about 120° C. during the operation of the motor vehicle 1'. Owing to these temperature conditions, the water 39 on the outer surface 51 of the inner wall part 49 can volatilize again by evaporation or vaporization. The water 39 can volatilize since heat can cross over from the inner wall part 49 of the water box 8' to the water 39 on the outer surface 51 of the inner wall part 49. Owing to this heat transfer, the temperature of the inner wall part 49 of the water box 8' is lowered. Owing to the lowered temperature of the inner wall part 49 of the water box 8', heat can cross over from the air flowing through the water box 8' to the inner wall part 49 of the water box 8' via the inner side 11', thereby enabling the temperature of the air flowing through the water box 8' to be lowered. The storage function of the fibers 44 allows continuous cooling of the inner wall part 49 of the water box 8' without the need continuously to apply the water 39 separated out at the evaporator 35 to the outer side 10' of the water box 8'. The fibers 44 preferably also have temperature-insulating properties in addition. The fibers 44 preferably form a nonwoven, preferably a felt. The decisive point is that the fibers used should have a good water absorption capacity. Fibers with the properties described above will be known to a person skilled in the art. A person skilled in the art will furthermore know of various methods for producing a water box in which the fibers 44 form part of the wall 9' and thus at least a partial area of the outer side 10' of the water box 8'. A water box 8 in which the fibers 44 form part of the wall 9' can be produced, for example, by inserting the fibers 44 in the form of a nonwoven into an injection mold and, after the insertion process, injecting plastic behind the nonwoven. Another possibility of producing a water box 8' of this kind is to produce the inner wall part 49 of the water box 8' in a first step, e.g. by means of injection molding, e.g. from plastic. In a second step, the outer wall part 50 or the fibers 44, preferably in the form of a nonwoven, are adhesively bonded to the outer surface 51 of the inner wall part 49, for example.

FIG. 3 shows schematically a second variant of the section through the front part of the motor vehicle according to the invention shown in FIG. 1. The construction and operation of the motor vehicle 1" illustrated in FIG. 3 corresponds substantially to the construction and operation of the motor vehicle 1 described with reference to FIG. 1. The motor vehicle 1" shown in FIG. 3 differs from the motor vehicle 1 shown in FIG. 1 in the device for collecting and applying the water 39 separated out at the evaporator 35 to at least one partial area of the water box 8". In the motor vehicle 1" according to the invention shown in FIG. 3, the water 39 is likewise separated out at the evaporator 35 from the air flowing through the air conditioner 22 in accordance with arrow 38, as already described in connection with FIG. 1.

The water 39 separated out is once again collected in the reservoir 40. The reservoir 40 is connected to an inlet opening 58 of a feed line 54, which has two outlet openings 57 and 59. The inlet opening 58 and the two outlet openings 57 and 59 are connected to one another via a cavity 55 of the feed line 54. Arranged in the cavity 55 are fibers 56, preferably in the form of a nonwoven, indicated by dashed lines. As can be seen in FIG. 3, the fibers 56 project, on the one hand, out of the inlet opening 58 into the water 39 contained in the reservoir 40 and separated out at the evaporator 35 and, on the other hand, out of the outlet openings 57 and 59, wherein these projecting fibers 56 rest on partial areas of the outer side 10' of the water box 8" or the surface of the bottom wall 45" and the surface of the top wall 47" of the water box 8". By means of the capillary effect, the fibers 56 are suitable for absorbing the water 39 separated out at the evaporator 35 and contained in the reservoir 40 and transferring it to the top wall 47" and the bottom wall 45" and discharging it onto the surface of the bottom wall 45" and the surface of the top wall 47", which surfaces, as already mentioned, are partial areas of the outer side 10" of the water box 8". The water 39 discharged onto the surface of the bottom wall 45" and the surface of the top wall 47" can volatilize again through evaporation or vaporization since the temperature of the outer side 10" of the water box 8" or the surface of the bottom wall 45" and the surface of the top wall 47" and hence approximately also the temperature of the wall 9" which forms the outer side 10" of the water box 8" are normally in a range of about 40° C. to about 120° C. Owing to the volatilization of the water 39, the air flowing through the water box 8" is cooled, as already described in connection with FIG. 1. As already mentioned, the cooled air flows into the air conditioner 22 and then into the passenger compartment 6. The volatilization of the water 39 on the outer side 10" of the water box 8" or the surface of the top wall 47" and the surface of the bottom wall 45" furthermore gives rise to a suction effect, with the result that the fibers 56 once again absorb more water 39 from the reservoir 40 and again transfer this to the top wall 47" and the bottom wall 45" and discharge it onto the outer side 10" of the water box 8" or onto the surface of the bottom wall 45" and onto the surface of the top wall 47". This suction effect gives rise to continuous application of the water 39 to the surface of the bottom wall 45" and the surface of the top wall 47" and thus to continuous cooling of the air flowing through the water box 8". The fibers 56 can consist of the same material or of different materials. It is conceivable, for example, for the fibers 56 arranged in the feed line 54 to consist of one material and for the fibers projecting out of the feed line 54 to comprise another material. The fibers projecting out of the feed line 54 are then connected integrally to the fibers arranged in the feed line 54, for example, or adjoin said fibers, allowing fluid transfer between the fibers.

FIG. 4 shows schematically a third variant of the section through the front part of the motor vehicle according to the invention as shown in FIG. 1. The construction and operation of the motor vehicle 1''' illustrated in FIG. 4 corresponds substantially to the construction and operation of the motor vehicle 1 described with reference to FIG. 1. The motor vehicle 1''' shown in FIG. 3 differs from the motor vehicle 1 shown in FIG. 1 in the construction of the water box and the device for collecting and applying the water separated out at the evaporator. The motor vehicle 1''' shown in FIG. 4 has a water box 8'''. The water box 8''' has an air inlet opening 12''', an air outlet opening 13''', a water outlet opening 14''' and a wall 9''', which forms an outer side 10''' and an inner side 11''' of the water box 8''', wherein the inner side 11''' forms only a water separating space 16'''. In contrast to the water box 1 shown in FIG. 1, water box 1''' therefore does not have an air feed line and an air outlet line. In the case of water box 8''', the water separating space 16''' is therefore connected directly to the air inlet opening 12''', the air outlet opening 13''' and the water outlet opening 14'''. Owing to the absence of an air feed line and an air outlet line, the water box 8''' is arranged in the engine compartment 7 of the motor vehicle 1''' in such a way that the air inlet opening 12''' is connected directly to the opening 24 of the engine hood 4, said opening being covered by the grille 25. The air outlet opening 13''' is connected directly to an aperture 62 in the bulkhead 5, which is connected to the air conditioner 22. Motor vehicle 1''' furthermore differs from motor vehicle 1 as regards the device for collecting and applying the water separated out at the evaporator. In the case of motor vehicle 1''', this device 40, 41, 42, 43 is of simpler design than in the case of motor vehicle 1 and is suitable for applying the water 39 separated out at the evaporator 35 to the surface of the bottom wall 45''' of the water box 8''', which surface is a partial area of the outer side 10''' of the water box.

Apart from the water 39 separated out at the evaporator 35, it is also possible to apply to the outer side 10, 10', 10'' or 10''' of the water box water which is separated out in the water separating space 16, in particular. This water can be passed through openings (not shown here), e.g. bores, pores or the water drain opening, to the outer side 10, 10', 10'' or 10''', for example. During the vaporization of this water, the corresponding wall of the water box is cooled.

LIST OF REFERENCE SIGNS 1 motor vehicle
2 body
3 windshield
4 engine hood
5 bulkhead
6 passenger compartment
7 engine compartment
8 water box
9 wall
10 outer side
11 inner side
12 air inlet opening
13 air outlet opening
14 water outlet opening
15 partial area
16 water separating space
17 partial area
18 partial area
19 valve
20 air feed line
21 air cutlet line
22 air conditioner
23 air feed line
24 opening
25 grille
26 bottom edge
27 arrow
28 arrow
29 arrow
30 device
31 arrow
32 prefilter
33 air feeding device
34 air filter
35 evaporator
36 water separator
37 heating device
38 arrow
39 water
40 reservoir
41 feed line
42 spray nozzle
43 fluid pump
44 fibers
45 bottom wall
46 side wall
47 top wall
48 wall section
49 inner wall part
50 outer wall part
51 outer surface
52 inner surface
53 outer surface
54 feed line
55 cavity
56 fibers
57 outlet opening
58 inlet opening
59 outlet opening
60 wall section
61 wall section
62 aperture

The invention claimed is:
1. A motor vehicle comprising
a passenger compartment;
an air conditioner, which is connected to the passenger compartment in order to feed air out of the air conditioner into the passenger compartment, wherein the air conditioner has an evaporator, which separates water from the air that is fed into the air conditioner;
a water box, which separates water from air and comprises a wall that forms an outer side and an inner side of the water box, and which also comprises at least one air inlet opening, at least one air outlet opening, and at least one water outlet opening, wherein the inner side forms a water separating space, which is connected to the air inlet opening, the air outlet opening and the water outlet opening, wherein the water outlet opening discharges water from the water separating space; and
a device that collects and applies the water separated out at the evaporator to at least one partial area of the outer side of the water box in order to cool the air fed to the passenger compartment; and
an air feeding device that draws air into the air conditioner via the air inlet opening;

wherein the air conditioner is connected to the air outlet opening in order to feed air out of the water box into the air conditioner.

2. The motor vehicle as claimed in claim 1, wherein the device for collecting and applying the water comprises at least one feed line.

3. The motor vehicle as claimed in claim 2, wherein the feed line has at least one inlet opening and at least one outlet opening, wherein the inlet opening and the outlet opening are connected to one another by a cavity, wherein fibers suitable, by means of the capillary effect, for transporting the water separated out at the evaporator at least from the inlet opening to the outlet opening and for releasing said water again are arranged at least in the cavity.

4. The motor vehicle as claimed in claim 3, wherein the fibers form a nonwoven.

5. The motor vehicle as claimed in claim 4, wherein the fibers form a felt.

6. The motor vehicle as claimed in claim 1, wherein the device for collecting and applying the water comprises at least one spray nozzle.

7. The motor vehicle as claimed in claim 1, wherein the device for collecting and applying the water comprises at least one fluid pump.

8. The motor vehicle as claimed in claim 1, wherein the device for collecting and applying the water comprises at least one reservoir for collecting the water separated out at the evaporator.

9. The motor vehicle as claimed in claim 1, wherein the air feeding device comprises at least one suction blower.

10. The motor vehicle as claimed in claim 1, wherein the wall which forms the outer side of the water box has fibers, such that at least one partial area of the outer side of the water box is formed by fibers, which are suitable, in accordance with the capillary effect, for absorbing the water separated out at the evaporator, for storing the absorbed water and for releasing the stored water again.

11. The motor vehicle as claimed in claim 1, wherein at least one device for separating water from the air flowing through the water box is arranged in the water separating space.

12. The motor vehicle as claimed in claim 1, wherein the wall forms at least one air outlet line, which connects the air outlet opening to the water separating space.

13. The motor vehicle as claimed in claim 1, wherein the wall forms at least one air feed line, which connects the air inlet opening to the water separating space.

14. The motor vehicle as claimed in claim 1, wherein the water separating space is connected directly to the air inlet opening, the air outlet opening and the water outlet opening.

15. The motor vehicle as claimed in claim 1, wherein the evaporator is arranged in the passenger compartment, and the water box is arranged in the engine compartment.

* * * * *